US012669409B2

(12) United States Patent
Lhospitalier et al.

(10) Patent No.: US 12,669,409 B2
(45) Date of Patent: Jun. 30, 2026

(54) DEVICE FOR MONITORING TIRES OF MORE THAN 30 INCHES VIA VIDEO MEANS

(71) Applicant: COMPAGNIE GENERALE DES ETABLISSEMENTS MICHELIN, Clermont-Ferrand (FR)

(72) Inventors: Denis Lhospitalier, Clermont-Ferrand (FR); Frederic Marques, Clermont-Ferrand (FR)

(73) Assignee: COMPAGNIE GENERALES DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 19/000,365

(22) Filed: Dec. 23, 2024

(65) Prior Publication Data

US 2025/0123185 A1 Apr. 17, 2025

Related U.S. Application Data

(63) Continuation of application No. 17/786,611, filed as application No. PCT/FR2020/052331 on Dec. 8, 2020, now Pat. No. 12,298,201.

(30) Foreign Application Priority Data

Dec. 20, 2019 (FR) ...................................... 1915280

(51) Int. Cl.
*G01M 17/02* (2006.01)
*B60B 30/10* (2006.01)
(Continued)

(52) U.S. Cl.
CPC ............. *G01M 17/02* (2013.01); *B60B 30/10* (2013.01); *B60S 5/00* (2013.01); *G01S 19/46* (2013.01);
(Continued)

(58) Field of Classification Search
CPC .. B60B 2340/50; B60B 29/00; B60C 23/0415
See application file for complete search history.

(56) References Cited

U.S. PATENT DOCUMENTS 4,773,011 A * 9/1988 VanHoose .............. G06Q 10/04
73/146
5,163,001 A 11/1992 Luke, Jr.
(Continued)

FOREIGN PATENT DOCUMENTS

EP 1522425 B1 4/2005
EP 2385435 A1 11/2011
(Continued)

OTHER PUBLICATIONS

International Search Report dated Feb. 1, 2021, in corresponding PCT/FR2020/052331 (4 pages).

*Primary Examiner* — Michael W Hotchkiss
(74) *Attorney, Agent, or Firm* — VENABLE LLP

(57) ABSTRACT

A method for monitoring the tires of vehicles transporting excavations in mines, using tire handling equipment, the tires being equipped with radio frequency identification tags and physical parameter sensors, uses a database comprising the identifiers of the vehicles, the identifiers of the tires, the identifiers of the sensors and of the positions of the tires on the axles.

8 Claims, 5 Drawing Sheets

(51) Int. Cl.

| | |
|---|---|
| B60S 5/00 | (2006.01) |
| G01S 19/46 | (2010.01) |
| G06K 7/10 | (2006.01) |
| G06K 19/077 | (2006.01) |
| G06V 20/59 | (2022.01) |
| G06V 20/64 | (2022.01) |

(52) U.S. Cl.

CPC ...  G06K 7/10366 (2013.01); G06K 19/07764
(2013.01); G06V 20/59 (2022.01); G06V
20/64 (2022.01); *G06V 2201/08* (2022.01)

(56) References Cited

U.S. PATENT DOCUMENTS

| | | | |
|---|---|---|---|
| 6,734,911 | B1 | 5/2004 | Lyons |
| 9,248,701 | B2 | 2/2016 | Calvi |
| 9,519,880 | B1 | 12/2016 | Cohn |
| 9,715,511 | B2 | 7/2017 | Champredonde et al. |
| 9,950,575 | B2 | 4/2018 | Marques et al. |
| 10,119,876 | B2 | 11/2018 | Marques et al. |
| 11,385,136 | B2 | 7/2022 | Suzuki et al. |
| 2004/0073339 | A1 | 4/2004 | Ruoppolo |
| 2005/0223788 | A1 | 10/2005 | Mancosu et al. |
| 2006/0175549 | A1 | 8/2006 | Miller et al. |
| 2007/0069877 | A1 | 3/2007 | Fogelstrom |
| 2013/0191331 | A1* | 7/2013 | Champredonde ...... G06Q 10/06 |
| | | | 340/10.1 |
| 2013/0238117 | A1 | 9/2013 | Yagawa |
| 2016/0152102 | A1 | 6/2016 | Campbell |
| 2016/0176638 | A1 | 6/2016 | Toebes |
| 2016/0236523 | A1 | 8/2016 | Moreau |
| 2017/0124784 | A1* | 5/2017 | Wittmann ............ G06V 30/224 |
| 2017/0174013 | A1* | 6/2017 | Fenkanyn ............... B60C 19/00 |
| 2017/0174014 | A1 | 6/2017 | Stewart et al. |
| 2018/0029797 | A1 | 2/2018 | Hance et al. |
| 2018/0043547 | A1 | 2/2018 | Hance et al. |
| 2020/0047570 | A1* | 2/2020 | Seitel .................. B60C 25/0554 |
| 2020/0103882 | A1 | 4/2020 | Sullivan et al. |
| 2020/0300733 | A1 | 9/2020 | Suzuki et al. |
| 2020/0310399 | A1 | 10/2020 | Qi et al. |
| 2020/0333789 | A1 | 10/2020 | Suzuki et al. |
| 2021/0114408 | A1 | 4/2021 | Darolfi |
| 2023/0052365 | A1 | 2/2023 | Vargo et al. |

FOREIGN PATENT DOCUMENTS

| | | | |
|---|---|---|---|
| FR | 2963453 | A1 | 2/2012 |
| WO | 2005/113261 | A1 | 12/2005 |
| WO | 2010/006667 | A2 | 1/2010 |
| WO | 2019/049807 | A1 | 3/2019 |

* cited by examiner

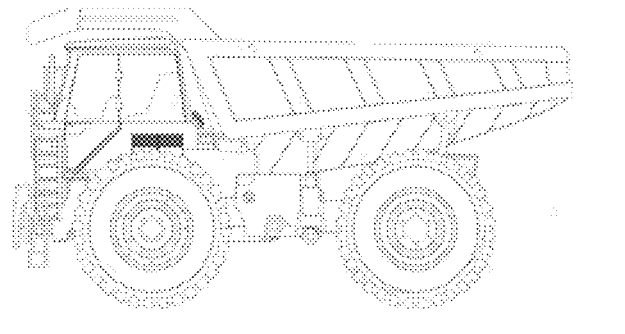
Figure 4-A
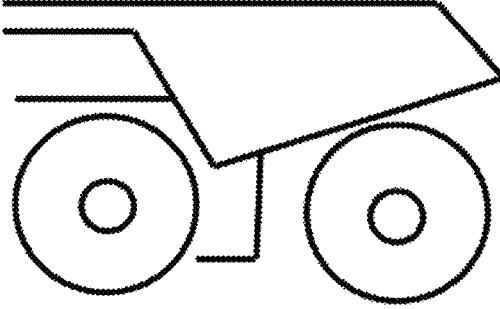
Figure 4-B

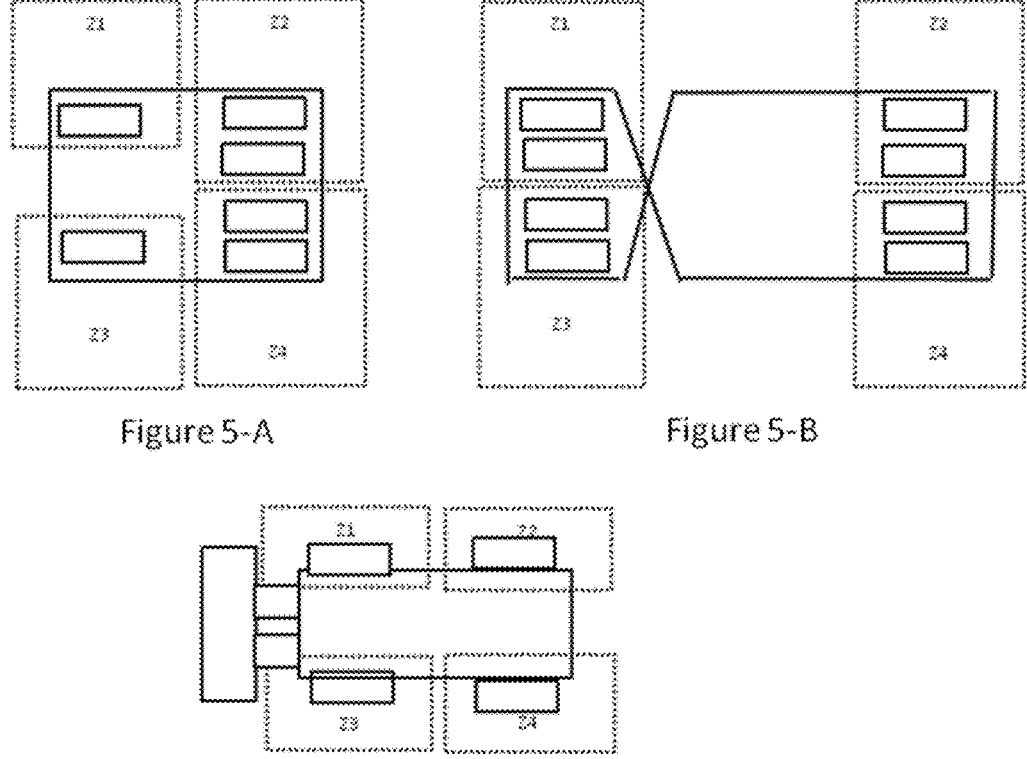
Figure 5-A                    Figure 5-B
Figure 5-C

DEVICE FOR MONITORING TIRES OF MORE THAN 30 INCHES VIA VIDEO MEANS

The present application is a continuation of U.S. patent application Ser. No. 17/786,611 filed Jun. 17, 2022, the entire disclosure of which is incorporated by reference herein.

BACKGROUND

The present invention relates to the field of management of a fleet of vehicles, in particular the tyres of these vehicles. More particularly, it applies but is not limited to the field of civil engineering vehicles.

Such vehicles are used, for example, in open-cast mines to transport materials extracted from quarries with loads that can weigh more than 350 tonnes. The tyres must consequently be dimensioned with an overall diameter that can measure more than 4 metres and can weigh 5 tonnes each.

By way of illustration, such a tyre has a standard designation according to the ETRTO (European Technical Rim and Tyre Organisation) of the 59/80 R 63 type, with an inflation pressure of 650 kPa. For such a tyre, the nominal tread width is 59 inches, the height of the sidewalls of the tyre is 80% of its nominal width, and this tyre is intended to be fitted to a wheel with a diameter of 63 inches. There are also other dimensions from 49 to 57 inches in diameter on these vehicles.

The size and weight of these tyres are such that dedicated handling equipment is required to carry out fitting and removal operations, either to change a tyre or to swap them from one axle to another.

Transport vehicles in mines exist having configurations of two to four axles with single or twin mounts depending on their intended use. Loaders equipped with buckets used for loading skips are included in transport vehicles.

Mining consists of extracting ores, i.e. rocks from the earth's crust containing useful minerals or metals, in sufficiently large quantities to justify their extraction.

The transport stage in a mining operation is essential for its economic profitability. The vehicles (dumper trucks) are usually in operation continuously in order to achieve maximum productivity by moving the largest volume of rubble to be treated by means of mineral processing.

Management of the tyres of the vehicle fleet consists in monitoring the inflation pressure, temperature and wear in a predictive maintenance approach in order to anticipate malfunctions related to the tyres, and to avoid stopping the vehicle to maximise its usage time.

Tyre wear is another performance aspect linked to inflation pressure control. A pressure that is too low by 20%, for example, shortens the life of the tyre by about 27%. Conversely, in the case of an overpressure of 20%, the service life decreases by about 12%.

The expectations of the mining customer are therefore the safety of people and equipment through a controlled use of tyres, productivity which must not be affected by product failures, and finally the duration of use of the tyres which must be as long as possible.

In order to manage the vehicle fleet, an operator manually records which vehicle includes which tyre and in which position. Thus, when changing the tyre, the operator must also manually replace the identifier of the tyre to be replaced with the identifier of the replacement tyre as well as an identifier of the position on the vehicle where the replacement was carried out. The operator further records the identifier of the vehicle on which the tyre has been changed.

The operator notes down these changes observed on the vehicle. The database manager then manually updates a database by entering the different identifiers. In addition, if the vehicle has a tyre monitoring system, e.g. tyre pressure, he also needs to update the data in this system.

The object of the invention is to provide a method that simplifies the management of tyres of transport vehicles in mines during tyre fitting and removal operations.

SUMMARY

The solution proposed by the invention consists of a method for monitoring the tyres of vehicles transporting excavations in mines, using tyre handling equipment, said tyres being equipped with radio frequency identification tags and physical parameter sensors, said method also using a database comprising the identifiers of the vehicles, the identifiers of the tyres, the identifiers of the sensors and of the positions of the tyres on the axles, and said method including the following steps:

a. The handling equipment receives an instruction containing a position of a tyre to be replaced on a transport vehicle;

b. the handling equipment identifies the transport vehicle by means of a video acquisition and processing system, the vehicle being equipped with a detectable visual identifier;

c. the handling equipment activates the detection of the tyre to be replaced on the vehicle by radio frequency means;

d. the handling equipment activates the detection of the axle and the position of the tyre on the axle of the vehicle by means of a video acquisition and processing system;

e. the handling equipment replaces the tyre to be replaced with a replacement tyre;

f. the database is updated with the identifiers of the vehicle and of the replacement tyre, and its position on the axle.

The invention proposes to use a method based on an industrial vision system coupled with a database to manage the monitoring of tyres of vehicles transporting excavations in mines.

Industrial vision consists in automating the tasks of controlling and monitoring tyre information by implementing a process capable of analysing, processing, and understanding one or more images taken by a video acquisition system.

For example, when changing tyres of a transport vehicle following a puncture or any other damage, the out-of-service tyre must be replaced with a new tyre or a tyre already in use but with residual running potential. The process must make it possible to trace the flow of associated information in terms of identification of the vehicle and the axle concerned, identification of the position on the axle, and also the physical parameters of the pressure and temperature levels of the tyres involved.

The swapping of tyres from the front axle to the rear axle is another example that involves the fitting and removal of tyres from transport vehicles.

Tyre monitoring concerns not only the traceability of the tyres, but also the monitoring of physical parameters of the tyre such as, for example, inflation pressure and/or temperature.

In any case, the management of tyre monitoring consists in knowing reliably, and at all times, their location, and that of the sensors measuring the associated physical parameters.

To do this, each tyre is fitted with a radio frequency identification (RFID) tag, and a physical parameter measurement sensor which also has a unique identifier. These devices are attached to the inside of the tyre.

RFID tags on tyres are preferably passive, operating as read-only. They consist of an antenna designed to operate in a given frequency band, connected to an electronic chip which stores the data. The information capacity of the RFID tag is typically 2 kB, but most only contain a 96-bit or 128-bit identification number. An electromagnetic signal is then sent to it, which makes it possible to activate the RFID chip and read the information it contains.

The reader sends a particular polling signal to which the tag responds. One of the simplest possible responses is the return of a digital ID, for example that of the EPC-96 standard which uses 96 bits.

The invention also provides a method which is implemented following a device (D) comprising a video acquisition and processing system having at least one camera optionally with suitable lighting to identify vehicles which are provided with a visual identifier detectable by the image acquisition and processing system; reading means for reading the identification tags of sensors and tyres; calculation and image processing means for detecting the axles and the position of the tyres on the axles; and a database which associates the identifiers of the tyres and of the vehicle on which they are fitted, as well as the positions on the axles.

The industrial vision device is installed on the handling equipment. In particular, at the front of the handling equipment between the tyre-gripping fork, the camera is fixed in such a way that it can film in the direction of movement in the space bounded by the diameter of the rim.

The industrial vision system is based on image processing applications. The aims of these applications can be of different types:

to detect the presence or absence of an object; for example, to identify the vehicle, the visual identifier attached to the mine transport vehicle allowing its detection;

to calculate the characteristics of one or more elements of the image; over a series of images or a sequence, for example, the presence of the tyre between the forks of the handling equipment is or is not determined in order to determine the action of the handling equipment;

in any event, starting with an initial image, the idea is to extract information from it; to do this, the operators are used as "software bricks" by combining and concatenating them; these techniques form the basis of industrial vision systems.

In the context of industrial vision, image processing takes place after the acquisition and digitisation stages, providing the image transformations and the calculation part to enable subsequent interpretation of the processed images.

Understanding image processing begins with understanding what an image is. The method and conditions of acquisition and digitisation of the processed images largely determine the operations that will have to be carried out to extract information. Indeed, many parameters are taken into account, the main ones being:

the acquisition resolution and coding method used during the digitisation which determine the degree of accuracy of any dimension measurements;

the optical settings used (including focus and depth of field) which determine, for example, the sharpness of the image;

the lighting conditions which determine a part of the variability of the processed images;

the noise from the image transmission chain;

the viewing angle.

Some typical examples of information that can be obtained from a digital image: the average luminance, the average contrast, the predominant colour, the average acuity level (sharp or blurred), the rate of colour uniformity, the presence or absence of certain objects.

The implementation of the method according to the invention occurs when, for example, a tyre of the mine transport vehicle is to be changed. The handling equipment moves towards the mine transport vehicle with the camera activated. The operator of the handling equipment knows from the central monitoring station the position of the tyre to be moved on the vehicle which defines the working area without knowing precisely the identifiers of the tyre and of the sensor.

The transport vehicle is detected by searching and reading the identification number displayed on the bucket or on the front of the vehicle. Another possibility would be to use the visual signature of the vehicle which is actually a dumper. Vehicle recognition thus consists in identifying the visual signature in the images produced by the camera using image processing software.

The central database contains vehicle data such as the number of axles, the single or twin assembly for each axle. From the vehicle identifier, a query can be made on the central database in order to read the vehicle-related data.

The identifiers of the tyres and of their sensor are detected by activating the reading of the RFID tags of the tyres and/or the sensors from the handling equipment. The cross-referencing of the information read from the database with that of the RFID reader enables precise identification of the tyre to be replaced.

The next step is to update the database with the identifiers of the replacement tyre and of its sensor, and the vehicle identifier.

The number of transport vehicles depends on the size of the mine, but in general, it takes one or two items of handling equipment (tyre handler) for several dozen transport vehicles.

The organisation of the operation includes storage areas for new, worn and replacement tyres, and a working area for changing or swapping tyres.

The handling equipment moves between the storage areas and the work area where the transport vehicles are located.

According to a first variant, the method comprises a step in which the handling equipment activates the detection of a used tyre storage area by means of a video acquisition and processing system.

According to a second variant, the method comprises a stage in which the handling equipment places the worn tyre in the used tyre storage area.

According to a third variant, the method comprises a step in which the handling equipment activates the detection of the replacement tyre storage area by means of a video acquisition and processing system.

In one variant of the invention, the video acquisition means comprise a three-dimensional (3D) vision camera.

The camera operating according to the time-of-flight principle enables the real-time measurement of a 3-dimensional (3D) scene.

To do this, these cameras illuminate the scene and objects measured by a flash of light, usually laser, and calculate the time that this flash takes to make the journey between the object and the camera. The time of flight of this flash is directly proportional to the distance between the camera and the measured object. This time-of-flight measurement is performed independently for each pixel of the camera, resulting in a complete 3D image of the measured object.

As an alternative to 3D vision by time of flight, according to a different variant of the invention, the video acquisition means comprise a video system with two two-dimensional (2D) cameras.

The video acquisition means are used to identify the vehicle, its position in relation to the handling equipment and the position of the tyre to be replaced on the axle.

To implement the video acquisition with two cameras: one camera having a better resolution and a reduced field, to analyse the details and make the distance measurements with precision, another, wide-angle, camera, enabling localisation of the handling equipment while keeping a large part of the truck in the image, even at a short distance. This camera could also be useful for identifying the number of the truck when it is written on the sides of the dumpster, because this number is usually displayed very high up, or all at the front of the truck.

It should also be noted that this camera is not intended to monitor the tyre, but to recognise the position in relation to the vehicle, or in a storage area, wherein its location on the tyre handler can be very different from the other camera.

The tyres of the device (D) preferably comprise a system with a passive identification tag and a sensor attached to the inside of the tyre comprising a micro reader communicating with the tag.

RFID transponders often have relatively short reading distances. For tyres of civil engineering machinery, which can be up to 4 m in diameter, the distance can often be insufficient to ensure a reading if the transponder is, for example, in a high position, far away from the reader. According to the invention, the use of an active electronic module, itself having longer-distance data transfer means, overcomes this limitation.

The sensor and passive tag system is advantageously equipped with an active electronic module for measuring and transferring physical parameters of the tyre, comprising:

i) at least one sensor (e.g. temperature sensor, pressure sensor, a preferably coil-type rev counter, etc.);

ii) a power supply to operate the sensor;

iii) a data transmission module to transmit the physical data received from the sensors to a remote receiver;

iv) the sensor is optionally able to read the tyre tag.

This electronic module for measuring and transferring physical tyre parameter data advantageously enables:

reading of the tyre identifier: either regularly or on demand via an interrogation module, or in relation to a low pressure or essentially zero pressure threshold test indicating that the tyre and the sensor have potentially been disassociated;

storage of this identifier in a local or remote memory;

transmission of this identifier via an essentially long-range transmission channel to a receiver on the vehicle, to a mobile reader or to a reading terminal;

in the case of a sensor which can read the tyre identifier, association of the measured physical tyre parameters with the correct tyre in a certain manner, such as, for example, by associating these parameters (km, pressure, temperature, etc.) with the tyre identifier of the patch linked to the tyre where the measurements were performed.

According to one variant of the invention, the detection of the tyre storage areas uses GPS means.

According to a different variant, the detection of the position of the tyres on the axles of the vehicle uses GPS means and a local beacon.

The invention also relates to tyre handling equipment for mine transport vehicles. Said vehicle has tyres characterised in that it is equipped with a device according to the invention.

According to one variant of the invention, the handling equipment (TH) for transport vehicle tyres is characterised in that it comprises a screen for monitoring and for interactions with the operator of the handling equipment (TH), for the steps of the method according to the invention.

BRIEF DESCRIPTION OF THE FIGURES

The invention will be better understood from a reading of the description which follows, given as a non-limiting example and with reference to drawings 1 to 5, in which:

FIG. 4-A shows a transport vehicle, and FIG. 4-B shows the associated visual signature for the image processing algorithm;

FIGS. 5-A, 5-B, 5-C show the work areas around the transport vehicles of the mine.

DETAILED DESCRIPTION

Figure 1:
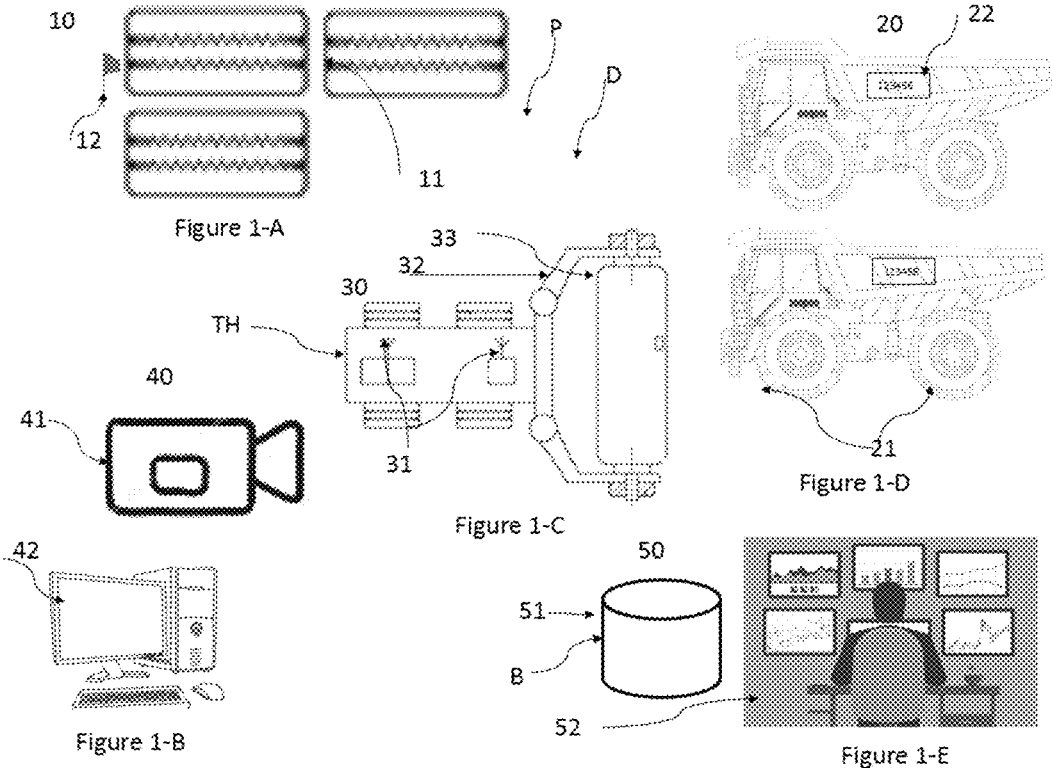
FIGS. 1-A to 1-E present an overview of the device used by the invention.

In FIGS. 1-A to 1-E, general reference 10 represents stocks of new, worn, or replacement tyres 11. Reference 12 is a visual recognition identifier of the storage area. Reference 20 relates to the mine transport vehicles, reference 21 refers to tyres equipped with RFID (Radio Frequency Identification) tags and sensors. Reference 22 denotes the visual recognition identifier of the vehicle. General reference 40 denotes the industrial vision system, having a camera 41 equipped with an integrated lighting system, a calculation unit 42 with image processing software. The general reference TH relates to the handling equipment in a top view, including grip forks 32 for gripping the tyre 33, held vertically when moving. Finally, reference 50 refers to the monitoring system, with the database 51 and the central station 52 with the monitoring screens.

Figure 2:
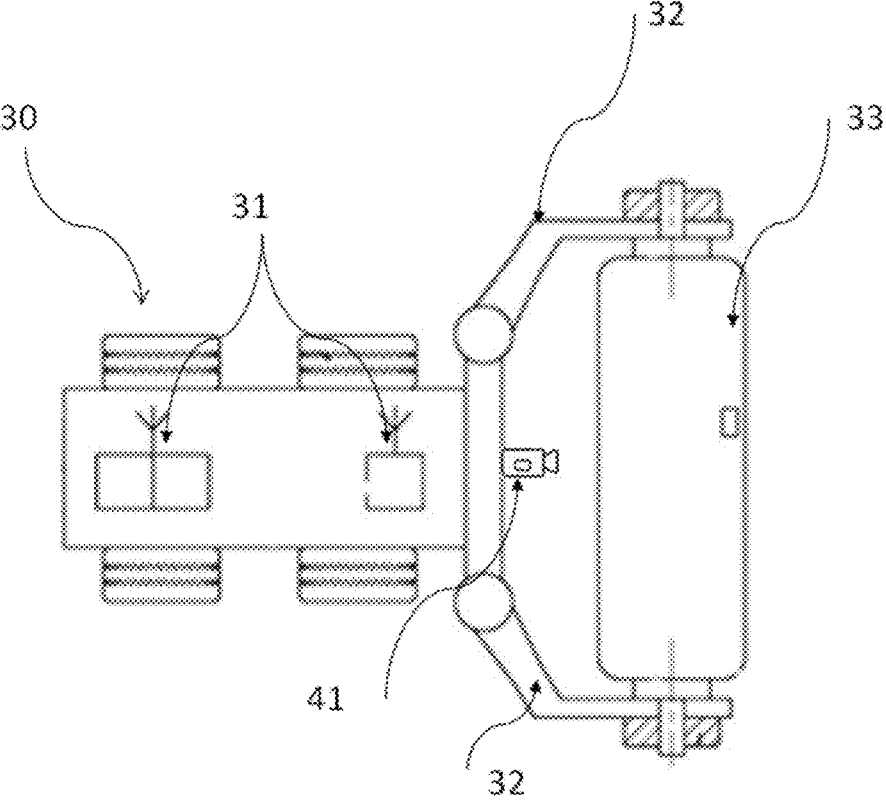
FIG. 2 shows the handling equipment with its video acquisition equipment.

FIG. 2 shows a top view of handling equipment with a camera 41 positioned at the front close to the axis of the centre of the tyre 33 so that it can be filmed in the direction of movement. The tyre 33 is gripped between the gripping forks 32 of the handling equipment which communicates with the central base via the antennas 31.

Figure 3:
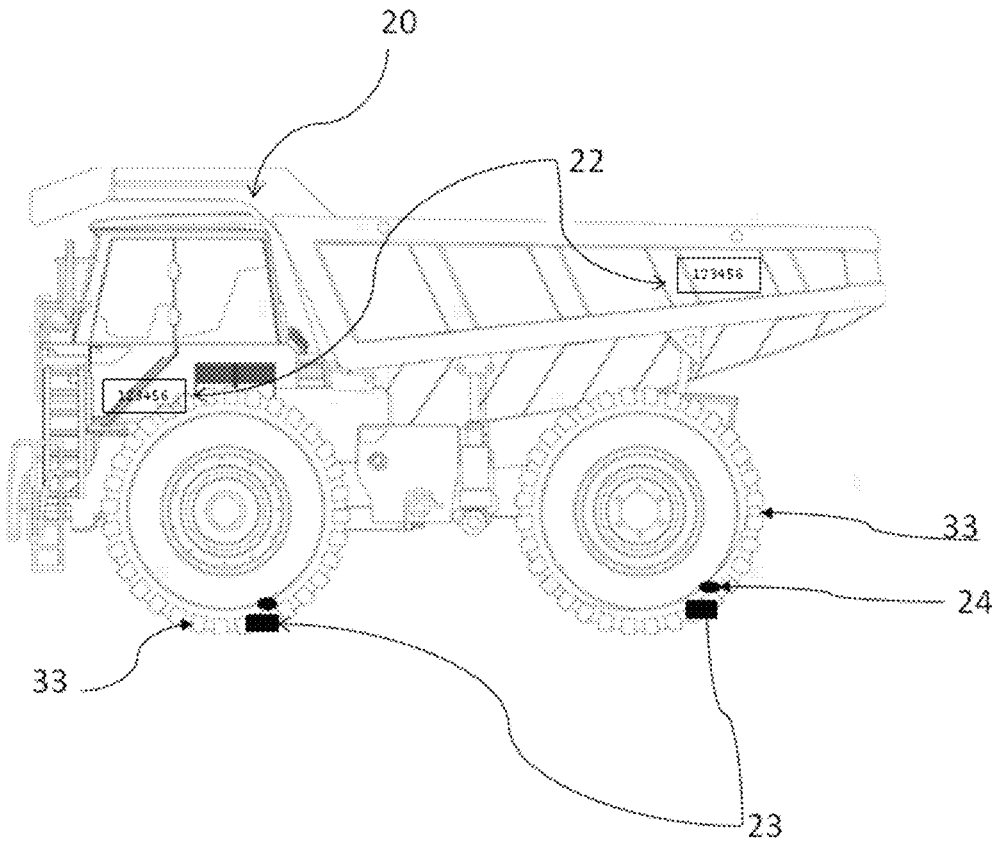
FIG. 3 shows the equipment of a transport vehicle relating to the invention.

FIG. 3 shows a transport vehicle denoted by general reference 20 whose tyres 33 are equipped with RFID identifiers 24 and sensors 23. The vehicle is detectable by the vision system thanks to the visual identifier 22.

FIG. 4-A shows a transport vehicle with its visual signature 4-B or its reference image which is used in the image processing algorithms to recognise the vehicles.

FIGS. 5-A, 5-B, 5-C respectively show a rigid dumper, an articulated dumper and a loader in a top view which are the mine vehicles in relation to the invention. These figures also show the working areas Z1, Z2, Z3, and Z4 which are the places where, for example, the activities of fitting and removing the tyres are performed by means of the handling equipment.

One exemplary embodiment of the invention will now be described during the removal of a tyre on a twin rear axle.

The operator of the handling equipment, informed by the central station, knows the work area to visit in order to replace the defective tyre. This may involve the right front tyre, for example, but the operator of the handling equipment does not know either the identifier of the tyre to be replaced or the identifier of its sensor. Moreover, for the sake of traceability, in addition to the identifiers, the axle on which the tyre is fitted as well as the position of the tyre on this axle are information to be entered in the monitoring database.

The removal operation takes place according to the following steps:

a. the handling equipment positions itself in the working area by advancing towards the transport vehicle in accordance with the information received from the central station;

b. the camera is activated for the detection of the axle and the position of the tyre on this axle in order to feed the database;

c. the tyre to be changed is removed using the handling equipment;

d. the gripped tyre is transported from the working area to the storage area by the handling equipment;

e. on the way to the storage area, the operator of the handling equipment activates the radio frequency (RFID) reading of the tyre and sensor tags. The tyre must be sufficiently far away from the vehicle with the other tyres fitted, and sufficiently far away from the storage area to obtain only the responses of the identifiers of the transported tyre and of the associated sensor;

f. the camera of the handling equipment is activated for the detection of the storage area where the tyre is placed;

g. the monitoring database is updated with the identifiers of the tyres, the sensors and their location on the axle, and/or their storage position.

The vehicles exist according to configurations of two or four axles with single or twin mounts on the central and rear axles depending on their destination of use. A reference image is associated with each transport vehicle configuration. FIGS. 4-A and 4-B show, for example, the transport vehicle and the associated reference image respectively.

The axle on which the tyre to be changed is fitted and its position on this axle must be identified in order to update the database. The axle and the position on the axle are detected by means of a three-dimensional (3D) camera.

After removal, the tyre is still gripped between the forks of the handling equipment and is in the vertical position, aligned parallel to the direction of movement. The camera is located at the front of the handling equipment close to the axis of the tyre so as to film in the direction of movement thanks to the space bounded by the diameter of the rim. This diameter is generally within the range from 49 to 63 inches.

The axle detection is performed while the handling equipment advances towards the transport vehicle with the 3D camera activated. The camera transmits the images to the processing unit which compares them with the reference image in order to identify the axle concerned in the working area.

The position of the tyre on the axle must then be determined in the case of a twin mount. The tyre either occupies the inner position on the axle or it occupies the outer position. The video acquisition system with the associated image processing is used to determine this position.

The position on the axle is again determined by the movement of the handling equipment towards the vehicle with the 3D camera activated. The images of the vehicle hub are transmitted to the processing unit in real time. The processing unit calculates the distance between the camera and the hub. If the distance between the camera and the hub is less than the minimum distance between the camera and the sidewall of the tyre, the position of the tyre on the axle is on the inside, otherwise it is located on the outside.

The invention claimed is:

1. A device for carrying out a method for monitoring tires of vehicles for transport in mines, using tire handling equipment, the tires being equipped with radio frequency identification tags and sensors for detecting physical parameters, the method using a database containing identifiers of the vehicles, identifiers of the tires, identifiers of the sensors and of positions of the tires on axles, the method including the following steps: receiving, via the tire handling equipment, an instruction containing an identity of a transport vehicle and a position of a tire to be replaced on the transport vehicle; identifying, via the tire handling equipment, the transport vehicle by means of a video acquisition and processing system, the transport vehicle being equipped with a detectable visual identifier, wherein the video acquisition and processing system comprises at least a wide angle camera for identifying the transport vehicle; activating, via the tire handling equipment, detection of the tire to be replaced on the transport vehicle by radio frequency means; activating, via the tire handling equipment, detection of the axles by means of the video acquisition and processing system, wherein the video acquisition and processing system further comprises a high resolution camera for identifying a vehicle axle of the tire to be replaced; activating, via the tire handling equipment, detection of the position of the tire on the vehicle axle by means of the video acquisition and processing system, wherein an axle position is an inner position or an outer position of a twin tire mount; replacing, via the tire handling equipment, the tire to be replaced with a replacement tire; and updating the database with the identifiers of the transport vehicle and of the replacement tire and a position of the replacement tire on the vehicle axle, and the device comprising: the video acquisition and processing system, wherein the video acquisition and processing system is mounted on the tire handling equipment in a manner in which at least one of the wide angle camera or the high resolution camera is oriented toward the transport vehicle, reading means for reading the radio frequency identification tags of the sensors and of the tires; calculation and image processing means; and a database which associates the identifiers of the tires and of the transport vehicle on which they are fitted, and the positions on the axles.

2. The device according to claim 1, wherein the high resolution camera of the video acquisition and processing system comprises a 3D camera.

3. The device according to claim 1, wherein both the high resolution camera and the wide angle camera of the video acquisition and processing system are 2D cameras.

4. The device according to claim 1, wherein detection of a used tire storage area and of a replacement tire storage area uses GPS means.

5. The device according to claim 1, wherein the tires comprise a system having a passive identification tag and at least one sensor of the sensors for detecting physical parameters attached to an inside of the tire comprising a reader communicating with the passive identification tag.

6. The device according to claim 5, wherein the at least one sensor and passive identification tag is provided with an active electronic module for measuring and transferring physical parameters of the tire comprising:

a power supply to operate the sensor; and a data transmission module to transmit physical data received from the at least one sensor to a remote receiver.

7. Tire handling equipment for the tires of transport vehicles in mines, the tire handling equipment being equipped with the device according to claim 1.

8. The tire handling equipment according to claim 7, wherein the tire handling equipment further comprises a screen for monitoring the steps of the method.

\* \* \* \* \*